US010447811B2

(12) United States Patent
Keller

(10) Patent No.: US 10,447,811 B2
(45) Date of Patent: Oct. 15, 2019

(54) CLOUD TO ON-PREMISES DEBUG SERVICE ROUTING

(71) Applicant: Citrix Systems, Inc., Fort Lauderdale, FL (US)

(72) Inventor: Steven A. Keller, Coral Springs, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 260 days.

(21) Appl. No.: 15/653,187

(22) Filed: Jul. 18, 2017

(65) Prior Publication Data

US 2019/0028569 A1      Jan. 24, 2019

(51) Int. Cl.
| | |
|---|---|
| H04L 12/26 | (2006.01) |
| H04L 29/08 | (2006.01) |
| H04L 29/12 | (2006.01) |
| H04L 29/06 | (2006.01) |
| G06F 11/36 | (2006.01) |
| H04L 12/911 | (2013.01) |

(52) U.S. Cl.
CPC ........ *H04L 67/327* (2013.01); *G06F 11/3664* (2013.01); *H04L 61/1511* (2013.01); *H04L 67/2814* (2013.01); *H04L 67/42* (2013.01); H04L 47/72 (2013.01); H04L 67/1002 (2013.01); H04L 67/1004 (2013.01); H04L 67/32 (2013.01)

(58) Field of Classification Search
CPC ... H04L 67/42; H04L 61/1511; H04L 67/327; H04L 67/32; H04L 67/1004; H04L 63/0281; H04L 61/15; H04L 67/28; H04L 29/12066; H04L 29/1233; H04L 41/5012; H04L 43/50; G06F 9/5005
See application file for complete search history.

(56) References Cited

U.S. PATENT DOCUMENTS

| | | | | |
|---|---|---|---|---|
| 9,262,300 | B1* | 2/2016 | Haba | G06F 11/362 |
| 9,571,350 | B2* | 2/2017 | Kamble | H04L 41/18 |
| 9,680,801 | B1* | 6/2017 | Martini | H04L 63/0428 |
| 2012/0131555 | A1* | 5/2012 | Hossain | G06F 11/362 |
| | | | | 717/124 |
| 2013/0080574 | A1* | 3/2013 | Prince | H04L 61/6013 |
| | | | | 709/217 |

(Continued)

*Primary Examiner* — Oanh Duong
(74) *Attorney, Agent, or Firm* — Christopher J. McKenna; Foley & Lardner LLP

(57) ABSTRACT

Described embodiments provide systems and methods for routing service requests. The system includes a first network of computing devices including a server hosting a service. The system includes a release router in the first network, the release router configured to receive a request for the service, the request forwarded to the release router responsive to resolving a hostname specified in the request using a DNS mapping the hostname to the release router, the hostname associated with the service hosted by the server. The release router is configured to identify a relay agent registered with the release router for debugging the service, the relay agent executed by a test platform in a second network, and to forward the request to the test platform in the second network, wherein the test platform resolves the hostname specified in the request using a local DNS mapping the hostname to a localhost address.

20 Claims, 6 Drawing Sheets

(56) References Cited

U.S. PATENT DOCUMENTS

| | | | |
|---|---|---|---|
| 2013/0080575 A1* | 3/2013 | Prince | H04L 45/741 |
| | | | 709/217 |
| 2015/0032895 A1* | 1/2015 | Xu | H04L 43/08 |
| | | | 709/226 |
| 2015/0193328 A1* | 7/2015 | Deakin | G06F 11/362 |
| | | | 714/38.1 |
| 2017/0063651 A1* | 3/2017 | Wang | H04L 43/04 |
| 2017/0255536 A1* | 9/2017 | Weissinger | H04L 65/60 |
| 2018/0159948 A1* | 6/2018 | Lepeska | H04L 67/02 |
| 2018/0367645 A1* | 12/2018 | Lepeska | H04L 67/42 |
| 2019/0102280 A1* | 4/2019 | Caldato | H04L 67/10 |

\* cited by examiner

CLOUD TO ON-PREMISES DEBUG SERVICE ROUTING

BACKGROUND

Network accessible computing systems, e.g., servers in a data center, provide various services over a network (e.g., the Internet). These systems are sometimes referred to as "cloud based" or "in the cloud" in reference to their off-premises location within the network (which is often depicted in figures as a cloud). Cloud-based services may be hosted on servers owned or managed by a third-party, e.g., under a tenancy or co-tenancy arrangement. The third-party providing the hardware (or time on shared hardware) may be referred to a cloud-services provider.

Cloud-based services may interact with each other. For example, a front-end (public-facing) interface server (such as a web host) may rely on a back-end database server or content host. These back-end services often reside in the same autonomous system ("AS") network as the front end services, eliminating any security or infrastructure barriers. However, provisioning services on a third-party cloud infrastructure may require administrative configuration, additional costs from the cloud-services provider, and risk of disruption to an existing services deployment. These problems can make it prohibitive to test new services or new versions of services in the cloud.

However, testing new services or new versions of services on a local computing system (that is, one not in the cloud) may also be difficult. For example, if the service is part of a deployment interacting with other services, then the other services also need to interact with the test version. This could be achieved by recreating all of the other services on a test platform, although this (too) may be prohibitively complex and/or inadequate for testing production-realistic scenarios.

These and other technical problems are addressed by the subject matter described.

SUMMARY

This Summary is provided to introduce a selection of concepts in a simplified form that are further described below in the Detailed Description. This Summary is not intended to identify key features or essential features, nor is it intended to limit the scope of the claims included herewith.

In at least one aspect, described is a method for routing service requests. The method includes receiving, by a release router in a first network, a request for a service hosted by a server in the first network, the request forwarded to the release router responsive to resolving a uniform resource locator ("URL") hostname specified in the request using a Domain Name System ("DNS") mapping the URL hostname to the release router, the URL hostname associated with the service hosted by the server. The method includes identifying, by the release router, a relay agent registered with the release router for debugging the service, the relay agent executed by a test platform in a second network. The method includes forwarding, by the release router, the request to the test platform in the second network, wherein the test platform resolves the URL hostname specified in the request using a local DNS mapping the URL hostname to a localhost address.

In at least one aspect, described is a system for routing service requests. The system includes a first network of computing devices including a server hosting a service. The system includes a release router in the first network, the release router configured to receive a request for the service hosted by the server in the first network, the request forwarded to the release router responsive to resolving a uniform resource locator ("URL") hostname specified in the request using a Domain Name System ("DNS") mapping the URL hostname to the release router, the URL hostname associated with the service hosted by the server. The release router is configured to identify a relay agent registered with the release router for debugging the service, the relay agent executed by a test platform in a second network, and to forward the request to the test platform in the second network, wherein the test platform resolves the URL hostname specified in the request using a local DNS mapping the URL hostname to a localhost address.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

The subject matter described covers topics that, among other things, enables a first service deployed in a network cloud to interact with another service running on a test platform, which may be on another network separate from the cloud autonomous system ("AS"). This can facilitate experimental service provisioning, enabling realistic testing and debugging. A service that is part of a multi-service deployment can be integrated into the deployment with minimal configuration, simplifying validation and pre-provisioning experimentation.

Figure 1A:
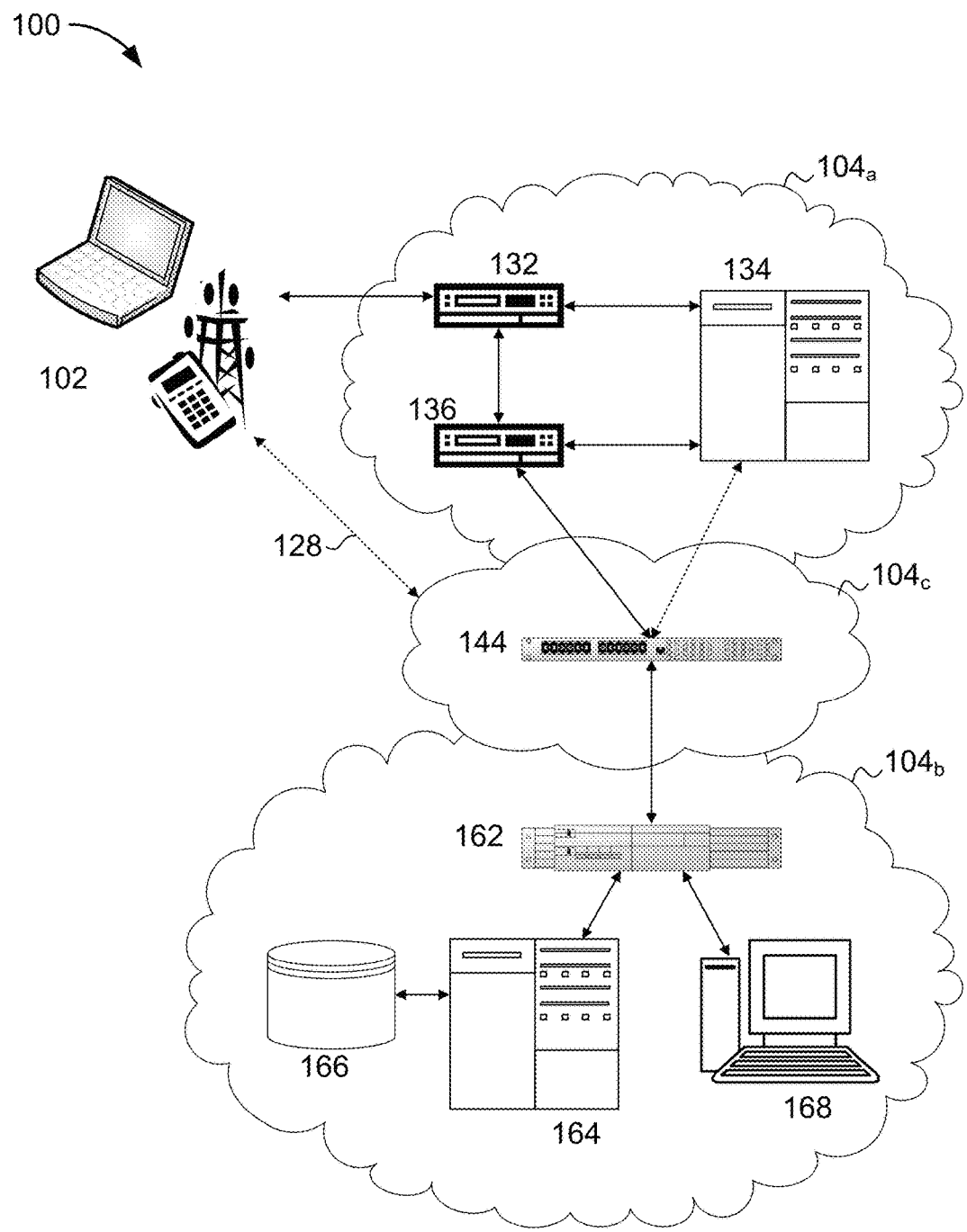
FIG. 1A is a block diagram of an illustrative network environment, in accordance with an illustrative embodiment.

FIG. 1A depicts an illustrative network environment 100. The network environment 100 includes a production network 104$_a$, a developer network 104$_b$, and one or more other networks such as a transit network 104$_c$ (the networks 104$_a$, 104$_b$, and 104$_c$ are referred to generally as networks 104). Within the network environment 100, client devices 102 communicate with servers 134, and the servers 134 provide one or more network services to the client devices 102. As shown in FIG. 1A, servers 134 are situated in the production network 104$_a$. The client devices 102 may communicate with the servers 134 directly through the production network 104$_a$ or through some intermediary network, e.g., the transit network 104$_c$. Network communications between the client devices 102 and the servers 134 flow through network devices 144 such as switches, routers, hubs, filters, firewalls, gateways, and so forth. The production network 104$_a$ includes a gateway 132 that directs traffic from client devices 102 to the servers 134. The host network 104$_a$ also includes a distributor 136, which is a network device that acts as a redirection agent or proxy. The distributor 136, can redirect traffic 128 from a client device 102 to another network 104 such as the developer network 104$_b$, e.g., via a transit network 104$_c$. One or more network devices 144 in the transit network 104$_c$ propagate the communication to a gateway device 162 in the other network 104$_b$, which may filter communications or otherwise control access to the network 104$_b$. As shown in FIG. 1A, the developer network 104$_b$ may include a local server 164 and/or a local workstation 168. The local server 164 is shown with access to a data storage 166, e.g., a local database system.

Suitable examples of client devices 102 include various processor-based devices that execute instructions for interactions with servers 134 via a network 104. Some example client devices 102 receive input from a user and present output to the user. The client device 102 may be any kind of computing device, including, for example, a desktop computer, a laptop or notepad computer, a thin client, a mobile device such as a tablet or electronic "pad," a smart phone or data phone, a gaming system, or any other device capable of the functions described herein. The client devices 102 are capable of exchanging information with other computing devices via the network 104. For example, a client device 102 may exchange information over the network 104 using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 102 supports network communication using Secure Socket Layer ("SSL") or Transport Layer Security ("TLS"), which encrypts communications layered over a reliable transport protocol (such as TCP). In some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at the client device 102 of software executing remotely (e.g., at a server 134), as though the remotely executed software were executed locally on the client device 102. In some embodiments, one or more of the servers 134 with which the client devices 102 communicate supports a custom instruction set, e.g., an application programming interface ("API"), and a custom application executed on the client device 102 implements the API. An application can implement an API using, for example, a library such as a dynamic link library ("DLL") or a software development kit ("SDK") provided to the application's developer.

Figure 1B:
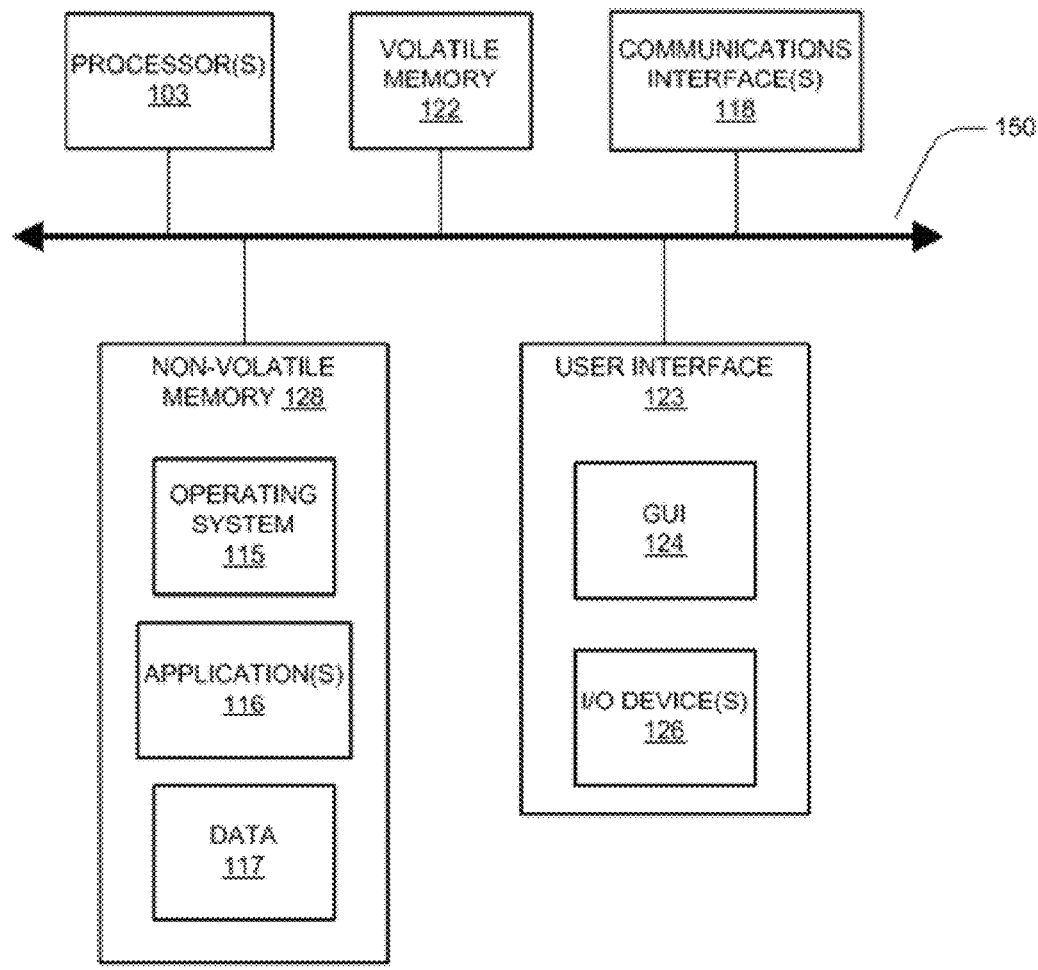
FIG. 1B is a block diagram of an example computing device, in accordance with an illustrative embodiment.

In some embodiments, the client device 102 includes one or more hardware elements for facilitating data input and data presentation. In some embodiments, the client device 102 is implemented using special purpose logic circuitry, e.g., an application specific integrated circuit ("ASIC"). In some embodiments, the client device 102 is implemented using a system on a chip ("SoC") semiconductor device that includes at least one processor (or microprocessor) core. In some embodiments, the client device 102 is implemented using a general purpose computing processor. FIG. 1B, described in more detail below, illustrates a computing device 101 that, in some configurations, is suitable for use as a client device 102.

The networks 104$_a$, 104$_b$, and 104$_c$ (referred to generally as a network 104) link devices for communication. In some embodiments, data flows through the network 104 as a flow of data packets in accordance with the OSI layers, e.g., as a TCP or ICA flow. An illustrative network 104 is the Internet; however, other networks may be used. Each network 104 may be an autonomous system ("AS"), i.e., a network that is operated under a consistent unified routing policy (or at least appears to from outside the AS network) and is generally managed by a single administrative entity (e.g., a system operator, administrator, or administrative group). A network 104 may be composed of multiple connected sub-networks or AS networks. Networks meet at boundary nodes, e.g., network devices 144 such as gateway nodes or routers. A network 104 may include wired links, optical links, and/or radio links. A network 104 may include a telephony network, including, for example, a wireless telephony network implementing a wireless communication protocol such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol. The network 104 may be public, private, or a combination of public and private networks. Each network 104 may be any type and/or form of data network and/or communication network.

The network devices 144 are network nodes that forward network data (e.g., data packets) between other network nodes. Suitable examples of network devices 144 include switches, routers, hubs, multi-homed computing devices, or any other device used for network communications. A network device 144 may include two or more network interfaces (or physical "ports," which should not be confused with transport protocol ports) and logic circuitry for identifying, for particular data, an egress interface connected to another device that will move the particular data towards a destination. In some embodiments, the network devices 144 direct traffic based on routing configuration data to forward data towards traffic destinations. In some embodiments, the network devices 144 forward data according to routing tables. In some embodiments, the network devices 144 forward data according to a configuration, e.g., a configuration set by a software defined network ("SDN") controller. In some embodiments, a network device 144 includes a content-addressable memory ("CAM") or ternary content-addressable memory ("TCAM"), used in identifying egress interfaces for routing data. In some embodiments, a network device 144 implements additional network functionality, or directs traffic through additional network nodes providing network functionality. For example, a network device 144 may pass traffic through a firewall, a network address translator ("NAT"), a network filter, or some other node providing network functionality.

One or more servers 134 may be logically grouped (e.g., as a server farm), and may either be geographically co-located (e.g., on premises) or geographically dispersed (e.g., cloud based) from client devices 102 and/or other servers 134. In some embodiments, a server 134 or group of servers 134 executes one or more applications on behalf of one or more of client devices 102 (e.g., as an application server). In some embodiments, the servers 134 provide functionality such as, but not limited to, file server, gateway server, proxy server, or other similar server functions. In some embodiments, client devices 102 may seek access to hosted applications on servers 134. In some embodiments, a network device such as the gateway 132 or specific servers 134 may provide load balancing across multiple servers 134 to process requests from client devices 102, act as a proxy or access server to provide access to the one or more servers 134, provide security and/or act as a firewall between a client 102 and a server 134, provide Domain Name Service ("DNS") resolution, provide one or more virtual servers or virtual internet protocol servers, and/or provide a secure virtual private network ("VPN") connection from a client 102 to a server 138, such as a secure socket layer ("SSL") VPN connection and/or provide encryption and decryption operations.

In described embodiments, client devices 102, servers 134, and other devices shown in FIG. 1A may be deployed as (or executed on) any type and form of computing device, such as any desktop computer, laptop computer, or mobile device capable of communication over at least one network and performing the operations described herein. For example, the client devices 102, servers 134, and other devices may each correspond to one computer, a plurality of computers, or a network of distributed computers such as the computing device 101 shown in FIG. 1B.

As shown in FIG. 1B, a computing device 101 may include one or more processors 103, volatile memory 122 (e.g., RAM), non-volatile memory 128, user interface (UI) 123, one or more communications interfaces 118 (e.g., a network interface card ("NIC")), and a communication bus 150. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 116, and data 117 such that, for example, computer instructions of operating system 115 and/or applications 116 are executed by processor(s) 103 out of volatile memory 122. Data 117 may be entered using an input device of GUI 124 or received from I/O device(s) 126. Various elements of the computing device 101 may communicate via communication bus 150. The computing device 101 as shown in FIG. 1B is shown merely as an example, as client devices 102, servers 138, and other network devices may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal. In some embodiments, the "processor" may be one or more physical processors or one or more "virtual" (e.g., remotely located or cloud-based) processors.

The communications interface 118 may include one or more interfaces to enable the computing device 101 to access a computer network 104 such as a LAN, a WAN, or the Internet through a variety of wired and/or wireless or cellular connections. In some embodiments, the communications interface 118 includes one or more network connection points (ports) and an interface controller. Network connection points may be wired connection points (e.g., Ethernet ports) or wireless (e.g., radio circuitry for Wi-Fi or mobile network communications).

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes.

In described embodiments, a first computing device 101 (e.g., a server 134) may execute an application on behalf of a user of a second computing device 101 (e.g., a client device 102). For example, the first computing device may execute a virtual machine providing an execution session within which applications execute on behalf of a user of the second computing device. For example, the first computing device may provide a hosted desktop session, may execute a terminal services session to provide a hosted desktop environment, or may provide access to a computing environment including one or more of: one or more applications, one or more desktop applications, and one or more desktop sessions in which one or more applications may execute. For example, in some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla.

Figure 2:
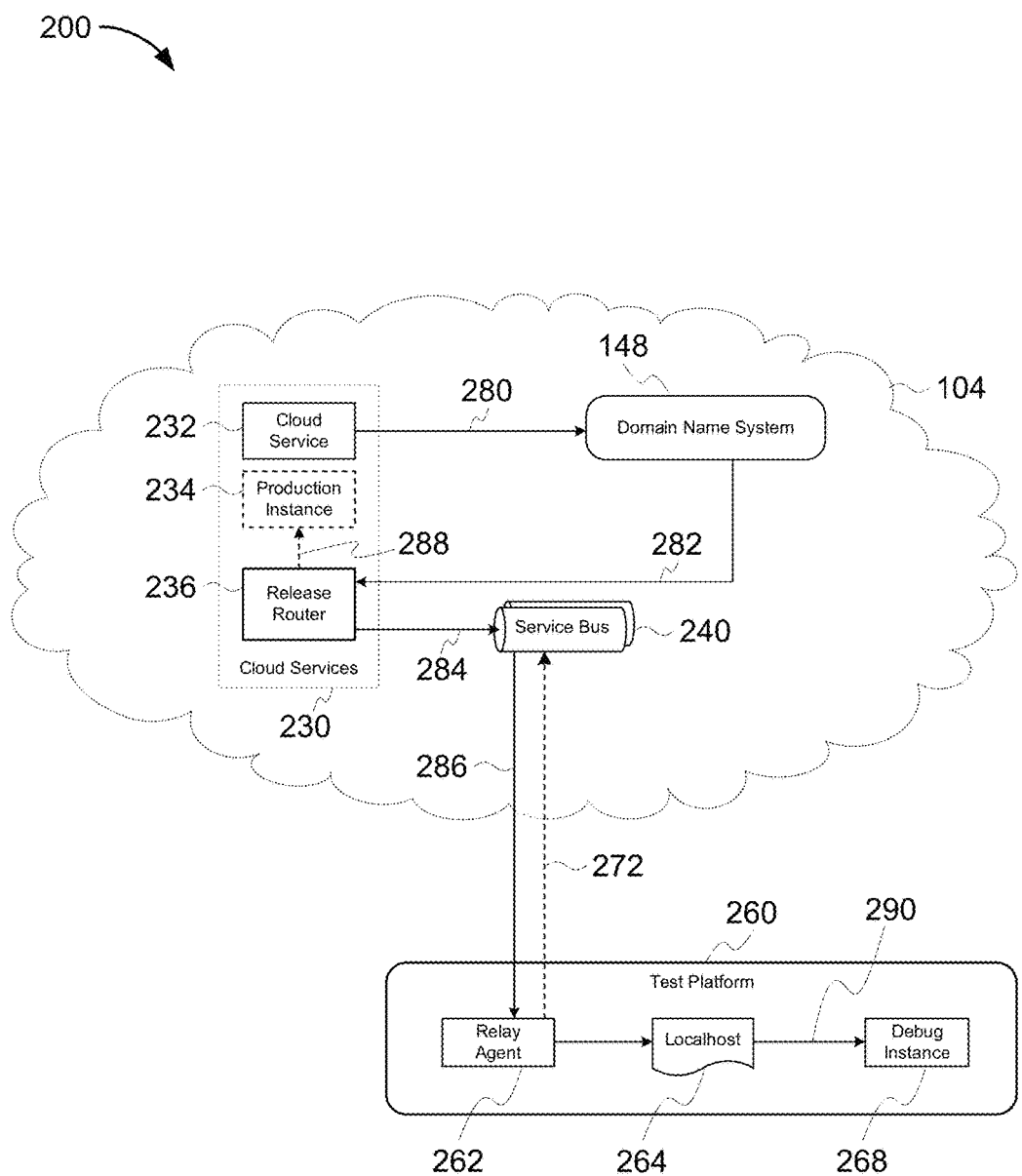
FIG. 2 is a block diagram of cloud services interacting with a test platform.
Figure 3A:
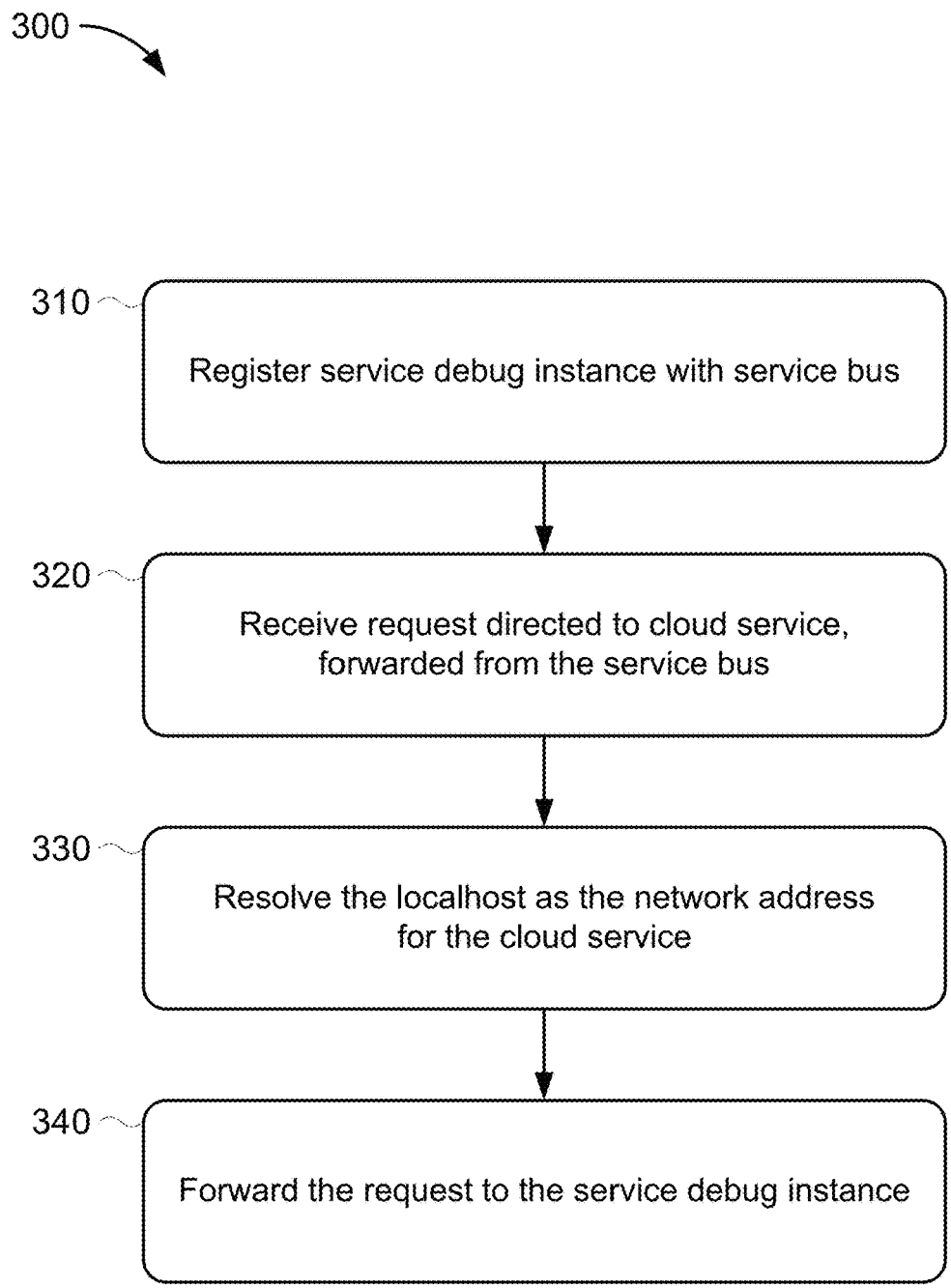
FIG. 3A is a flowchart for an example method by which a test platform may receive service requests.
Figure 3B:
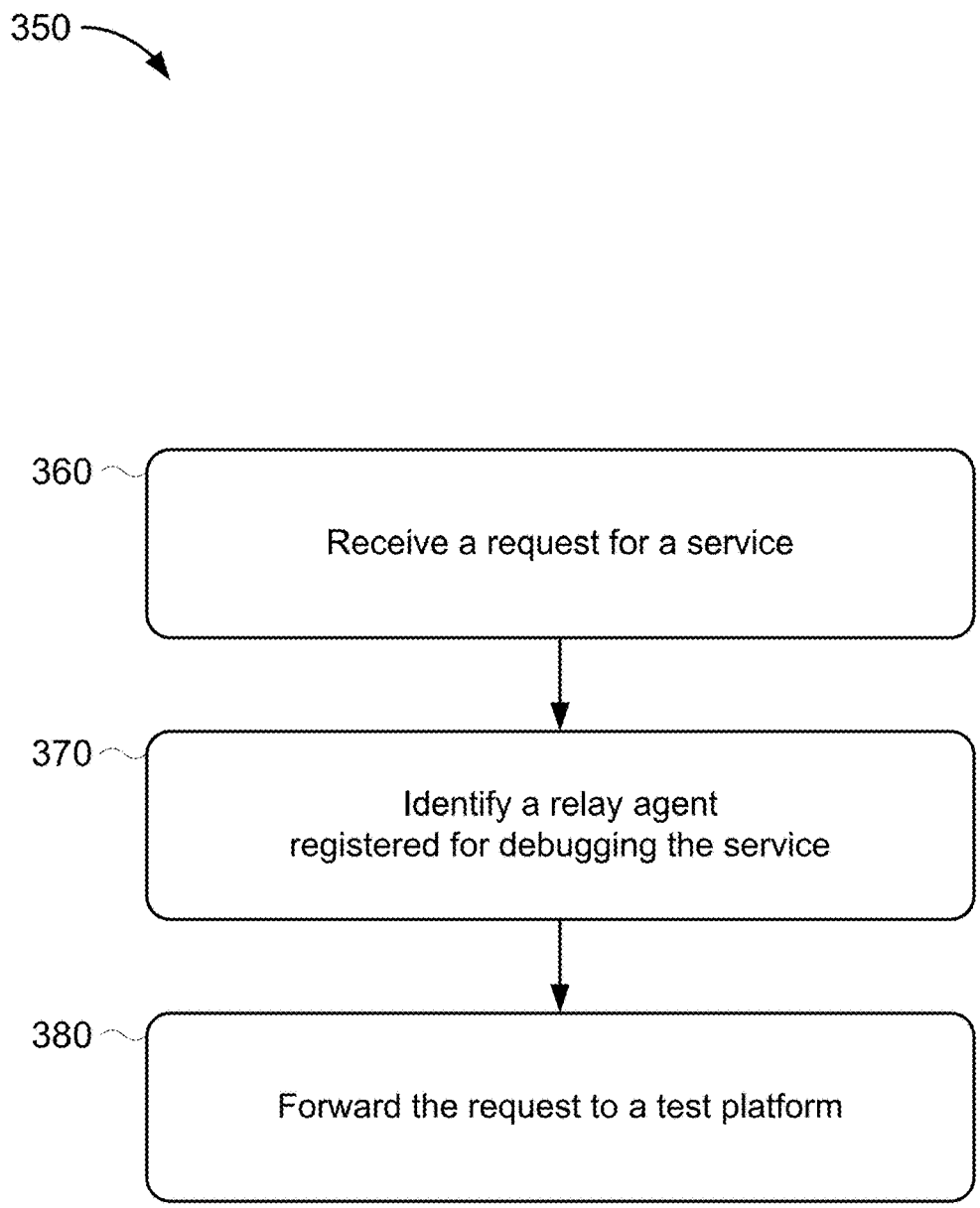
FIG. 3B is a flowchart for an example method by which a release router may submit service requests to a test platform.

FIG. 2 is a block diagram 200 of cloud services 230 interacting with a test platform 260. The cloud services 230 are hosted on computing systems 101 in a network 104 (e.g., the production network $104_a$ shown in FIG. 1A). The network 104 also provides a domain name system ("DNS") 148 for network address resolution. DNS services may be provided by one or more DNS servers. The cloud services 230 include a first cloud service 232 that may interact with a production instance 234 of a second cloud service. The cloud services 230 include a release router 236, which receives requests for a service (e.g., for the second service) and determines whether to route the request to the production instance 234 or to a debug instance 268 hosted on a test platform 260. For example, described in more detail below, FIG. 3A is a flowchart for an example method 300 by which a test platform 260 may receive service requests, and FIG. 3B is a flowchart for an example method 350 by which a release router 236 may submit service requests to a test platform 260. In some embodiments, the test platform 260 implements the method 300 illustrated in FIG. 3A. In some embodiments, the release router 236 implements the method 350 illustrated in FIG. 3B. In some embodiments, the release router 236 is hosted on a computing device 101 in the network 104. In some embodiments, the release router 236 is a proxy for the server hosting the production instance 234.

Still referring to FIG. 2, the illustrated network 104 (e.g., the autonomous system ("AS") network of the cloud services 230 host) includes a service bus 240. In some embodiments, the service bus 240 maintains a communication channel with the test platform 260, e.g., initiated by a registration request from the test platform 260. In some embodiments, the service bus 240 is a cloud service 230 hosted by the same provider. In some embodiments, the service bus 240 is in the same network 104 as the cloud services 230. In some embodiments, the service bus 240 is in a separate network from the cloud services 230.

Figure 4:
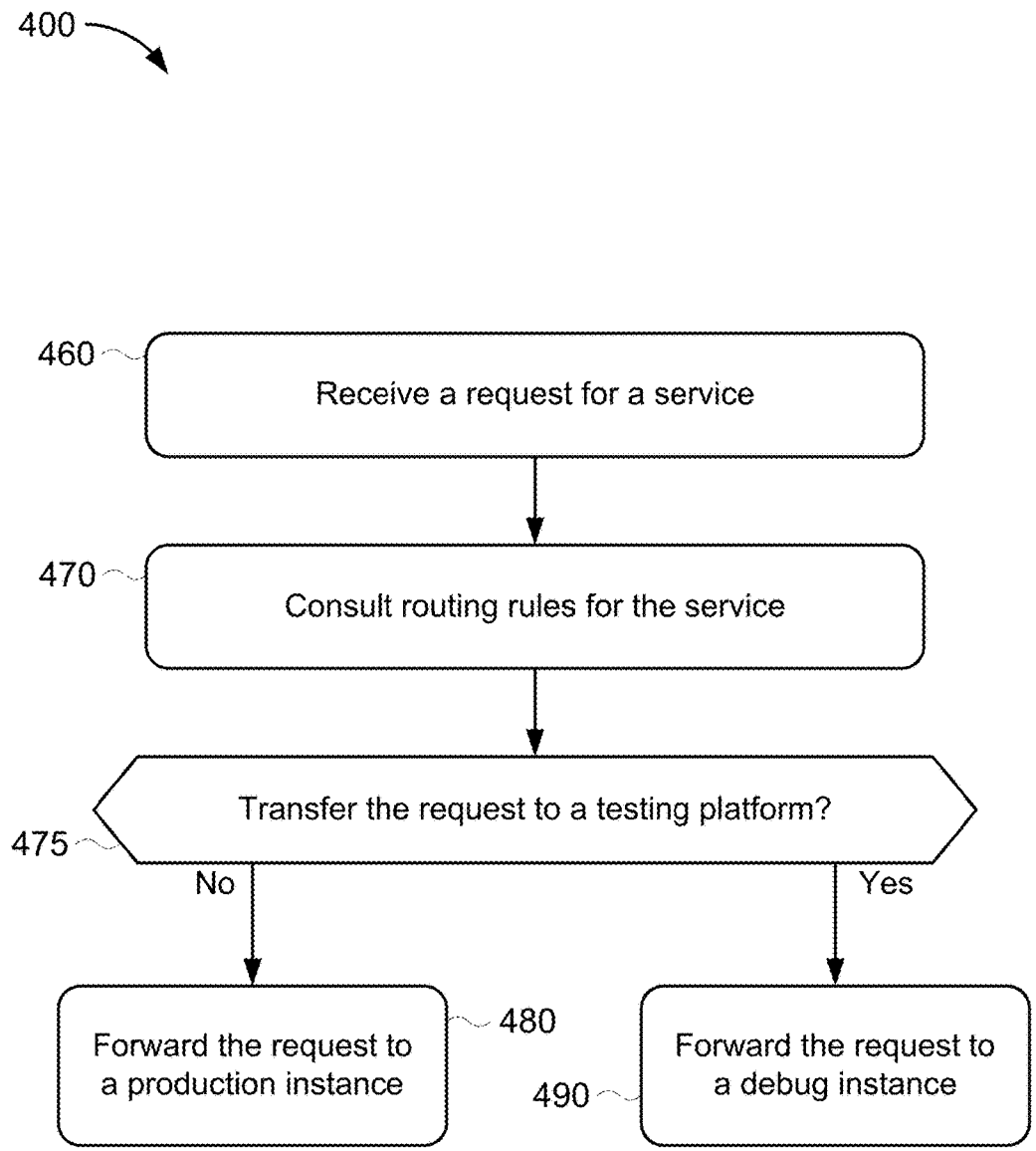
FIG. 4 is a flowchart for an example method by which the release router may determine whether to submit a service request to the test platform.

The release router 236, when forwarding a request to a debug instance 268 sends the request the service bus 240 for distribution to the test platform 260. The test platform 260 includes a relay agent 262 interfacing with the service bus 240, domain name resolution data 264, and the debug instance 268. For example, the test platform 260 may be a computing device 101 (such as the server 164 or developer workstation 168 described in reference to FIG. 1A) executing the relay agent 262 and the debug instance 268. In some embodiments, requests may be specifically directed to a uniform resource locator ("URL") indicating a debug request. For example, the URL may include a subdomain such as "debug" or "test." The release router 236, upon receiving a request directed to a debug-specific URL forwards the request to the service bus 240. In some embodiments, the release router 236 may be configured to redirect production requests to the debug instance 268. The debug instance 268 may handle a subset of production requests. In such instances, the release router 236 selects a subset of requests for forwarding to the debug instance 268 and forwards the rest to the production instance 234. FIG. 4 is a flowchart for an example method 400 by which the release router may determine whether to submit a service request to the test platform 260. These and similar strategies allow a production service deployed in the cloud to interact with a test instance of a service running on a test platform, which may be on another network separate from the cloud autonomous system ("AS").

FIG. 2 illustrates a series of communications (shown as arrows) that are described in more detail in reference to FIG. 3A, FIG. 3B, and FIG. 4. Arrow 272 illustrates a communication from the relay agent 262 to the service bus 240 to register the debug instance 268. Arrow 280 illustrates a request from the first cloud service 232 to a DNS 148 for forwarding to a second cloud service provided by the production instance 234 and the debug instance 268. Network devices use the domain name system to resolve a network address for a network communication (e.g., requests) addressed to a uniform resource locator ("URL"). The URL includes domain information that maps to one or more specific network addresses. A first cloud service 232 may send requests to another cloud service (e.g., production instance 234) using a URL instead of a specific network address. That is, by using DNS, a service can reach another service without needing to know the exact network address of the object service. This allows for deployment flexibility as the network address can be changed without requiring reconfiguration of other services. Arrow 282 illustrates resolution of the URL to a network address for the release router 236. If the release router 236 determines to forward the request to the test platform 260, then it forwards the request to the service bus 240. Arrow 284 illustrates transmission of the request from the release router 236 to the service bus 240. The service bus 240 then propagates the request to the test platform 260, e.g., based on the earlier registration. Arrow 286 illustrates transmission of the request from the service bus 240 to the test platform 260. The relay agent 262 acts as the main listener at the test platform 260 and attempts to resolve the URL. However, DNS resolution begins with local domain name resolution data 264, which is configured at the test platform 260 to map the URL to the localhost. Accordingly, the test platform 260 passes the request to the debug instance 268. Arrow 290 illustrates the localhost resolution causing the request to be passed to the debug instance 268. From the perspective of the first cloud service 232, the request 280 is processed by an instance of the second cloud service—only the request is processed by the debug instance 268 instead of the production instance 234. If the release router 236 determines, instead, not to forward the request from the first cloud service 232 to the debug instance 268, then it forwards the request to the production instance 234. Arrow 288 illustrates transmission of the request from the release router 236 to the production instance 234. These communications are described in more detail in reference to FIG. 3A, FIG. 3B, and FIG. 4.

FIG. 3A is a flowchart for an example method 300 by which a test platform 260 may receive service requests. In broad overview of the method 300, at stage 310, a relay agent 262 for a test platform 260 registers a service debug instance 268 with a service bus 240. At stage 320, the relay agent 262 receives a request directed to a cloud service forwarded from the service bus 240. At stage 330, the relay agent 262 resolves the localhost as the network address for the cloud service. At stage 340, the relay agent 262 forwards the request to the service debug instance 268.

Referring to FIG. 3A in more detail, at stage 310, a relay agent 262 for a test platform 260 registers a service debug instance 268 with a service bus 240. In some embodiments, the registration originates with the test platform 260, the relay agent 262, or the debug instance 268 of the service hosted by the test platform. The registration is illustrated in FIG. 2 as arrow 272. In some embodiments, the registration is a message from the test platform 260 to the service debug instance 268 identifying the service to be tested or debugged. In some embodiments, the registration includes authentication data, authorization data, and/or configuration data. For example, in some embodiments, the registration includes a network address for the test platform 260, identification of the service to be tested, and an expiration or time-to-live value. In some embodiments, the registration request is transmitted by the test platform 260 to the service bus 240, and the service bus 240 then registers the relay agent 262 with the release router 236. For example, in some embodiments, the service bus 240 forwards the registration request to the release router 236.

In some embodiments, the service debug instance 268 is registered with the service bus 240 separately, e.g., manually configured by an administrator. In some such embodiments, the test platform 260 completes the registration by sending a message from the relay agent 262 to the service bus 240, e.g., piercing a network firewall. In some embodiments, registration includes adding the service domain to local domain name resolution data 264 mapping the service domain to localhost.

At stage 320, the relay agent 262 receives a request directed to a cloud service forwarded from the service bus 240. Receiving the request at stage 320 is illustrated in FIG. 2 as arrow 286. The received request is directed to a uniform resource locator ("URL") that includes domain information corresponding to the service being tested. In some embodiments, the URL indicates a production service. In some embodiments, the URL specifically indicates a request directed to a debug or test instance. The service bus 240 forwards the request to the relay agent 262 based on the registration from stage 310.

At stage 330, the relay agent 262 resolves the localhost as the network address for the cloud service. The relay agent 262 uses local domain name resolution data 264 to identify a next-hop for the received request. However, the local domain name resolution data 264 is configured to map the URL of the received request to the localhost, or to a network address corresponding to the host of the service debug instance 268. In the Internet Protocol version 4 ("IPv4"), localhost is usually 127.0.0.1, although it may be any loopback address such as addresses in the range 127.0.0.0/8. In the Internet Protocol version 6 ("IPv6"), localhost is::1.

At stage 340, the relay agent 262 forwards the request to the service debug instance 268. Passing the request to the debug instance 268 is illustrated in FIG. 2 as arrow 290. In some embodiments, the relay agent 262 transmits the request to the resolved localhost address. In some embodiments, the relay agent 262 passes the request to the service debug instance 268 internally. The service debug instance 268 may then process the request.

In some embodiments, the service debug instance 268 is identical to the production instance 234. In some embodiments, the service debug instance 268 is an instrumented version of the production instance 234. For example, it may be configured to generate additional reports or outputs for monitoring purposes. In some embodiments, the service debug instance 268 is a new or revised version of the production instance 234. It may be run as a debugging instance to verify functionality prior to deployment in the production environment.

FIG. 3B is a flowchart for an example method 350 by which a release router 236 may submit service requests to a test platform 260. In broad overview of the method 350, at stage 360, the release router 236 receives a request for a service. At stage 370, the release router 236 identifies a relay agent registered for debugging the service and, at stage 380, forwards the request to a test platform 260.

Referring to FIG. 3B in more detail, at stage 360, the release router 236 receives a request for a service. Receiving the request at stage 360 is illustrated in FIG. 2 as arrow 282. The request received by the release router 236 may be a request for a service hosted by a server in the same network 104 as the release router 236, e.g., the service production instance 234. In some embodiments, the request is addressed to a uniform resource locator ("URL") generally identifying the service. In some embodiments, the request is addressed to a URL specifically indicating that it is a test or debug request. For example, the URL main include a specific subdomain such as "test" or "debug." In some embodiments, the release router 236 receives the request based on a DNS 148 configuration mapping the domain (or subdomain) to the release router 236. In some embodiments, the request originates with another service in the same network 104, e.g., the cloud service 232. In some embodiments, the request originates from another system, e.g., an external computer such as a client device 102 in another network.

At stage 370, the release router 236 identifies a relay agent registered for debugging the service. In some embodiments, the release router 236 implements the method 400 illustrated in FIG. 4. In some embodiments, the release router 236 consults a set of routing rules. In some embodiments, the release router 236 identifies the relay agent 262 registered with the service bus 240 for debugging the service. In some embodiments, the release router 236 identifies the relay agent 262 registered with the release router 236 for debugging the service. For example, as described above in reference to FIG. 3A, in some embodiments, when the relay agent 262 registers with the service bus 240, the service bus 240 then propagates the registration to the release router 236.

At stage 380, the release router 236 forwards the request to the test platform 260. In some embodiments, the release router 236 forwards the request to the test platform 260 via the service bus 240. Forwarding the request to the service bus 240 is illustrated in FIG. 2 as arrow 284. The service bus 240 then forwards the request to the relay agent 262 at the test platform 260. Forwarding the request to the test platform 260 is illustrated in FIG. 2 as arrow 286.

FIG. 4 is a flowchart for an example method 400 by which the release router may determine whether to submit a service request to the test platform 260. In broad overview of the method 400, at stage 460, a release router 236 receives a request for a service. At stage 470, the release router 236 consults routing rules for the service and determines, as stage 475, whether to transfer the request to a testing platform 260. If not, then at stage 480, the release router 236 forwards the request to a production instance 234 of the service. However, if at stage 475, the release router 236 determines to transfer the request to the testing platform 260, then at stage 490, the release router 236 forward the request to a debug instance 268 hosted by the testing platform 260. In some embodiments, the release router 236 forwards the request to the debug instance 268 at stage 490 via the service bus 240.

Referring to FIG. 4 in more detail, at stage 460, a release router 236 receives a request for a service. In some embodiments, stage 460 is equivalent to stage 360 of the method 350 described in reference to FIG. 3B. In some embodiments, the request received at stage 460 includes one or more characteristics that may be used by the release router 236 for determining whether to use the request for testing. For example, the request may explicitly be designated for testing (e.g., it may be specifically addressed to a test or debug domain). In some embodiments, the release router 460 selects a random subset of requests to a service for redirection to a test instance of the service as "canary" requests.

At stage 470, the release router 236 consults routing rules for the service and determines, as stage 475, whether to transfer the request to a testing platform 260. In some embodiments, the routing rules are a set of parameters. In some embodiments, the routing rules are a list of domain names designated for test or debug purposes. In some embodiments, the routing rules may be easily modifiable, e.g., from a remote developer workstation. In some embodiments, the routing rules may be statistics driven, e.g., requiring a set percentage of requests to be redirected. In some embodiments, the routing rules may include a set of conditions that, if satisfied by the request, indicate that the request should be forwarded to the debug instance 268. In some embodiments, the set of routing rules are maintained based on a registration for one of: the test platform 260, the relay agent 262, or a test instance 268 of the service hosted by the test platform 260. The release router 236 checks the set of routing rules for debug service requests, and identifies the test platform 260 or the relay agent 262 based on the set of routing rules.

At stage 480, if the release router 236 determines at stage 475 not to transfer the request to the testing platform 260, then the release router 236 forwards the request to a production instance 234 of the service. In some embodiments, the release router 236 forwards the request using an application programming interface ("API") for the production instance 234 of the service. In some embodiments, the release router 236 forwards the request via the network 104.

At stage 490, if the release router 236 determines at stage 475 to transfer the request to the testing platform 260, then the release router 236 forwards the request to a debug instance 268 hosted by the testing platform 260. In some embodiments, the release router 236 forwards the request to the debug instance 268 at stage 490 via the service bus 240. The forwarded request may retain the same URL as the original request.

The systems and methods described may be used in a variety of embodiments. For example, and without limitation:

In at least one aspect, the above describes a method for routing service requests. The method includes receiving, by a release router in a first network, a request for a service hosted by a server in the first network, the request forwarded to the release router responsive to resolving a uniform resource locator ("URL") hostname specified in the request using a Domain Name System ("DNS") mapping the URL hostname to the release router, the URL hostname associated with the service hosted by the server. The method includes identifying, by the release router, a relay agent registered with the release router for debugging the service, the relay agent executed by a test platform in a second network. The method includes forwarding, by the release router, the request to the test platform in the second network, wherein the test platform resolves the URL hostname specified in the request using a local DNS mapping the URL hostname to a localhost address.

In some embodiments of the method, the test platform is a computing device hosting a test instance of the service and configured for debugging the service. In some embodiments of the method, the release router is a proxy for the server and hosted on a computing device in the first network.

Some embodiments of the method include checking, by the release router, a set of routing rules for debug service requests and identifying the relay agent based on the set of routing rules. Some embodiments of the method include updating the set of routing rules based on a registration for one of: the test platform, the relay agent, or a test instance of the service hosted by the test platform.

Some embodiments of the method include forwarding the request to the test platform in the second network, by the release router, via a service bus external to the second network, wherein the relay agent is registered with the service bus to receive the request. Some embodiments of the method include configuring the service bus to forward, to the second network, requests directed to resource identifiers specifying a name for the service, wherein the URL of the received request specifies the name for the service. In some embodiments, the service bus is situated in the first network.

Some embodiments of the method include receiving, by the release router in the first network, a second request for the service hosted by the server in the first network, checking a set of routing rules, and forwarding the second request to the server in the first network responsive to the set of rules.

In at least one aspect, these methods may be encoded as computer-readable instructions for execution by one or more processors. The computer-readable instructions can be encoded on non-transitory computer-readable media.

In at least one aspect, the above describes a system for routing service requests. The system includes a first network of computing devices including a server hosting a service. The system includes a release router in the first network, the release router configured to receive a request for the service hosted by the server in the first network, the request forwarded to the release router responsive to resolving a uniform resource locator ("URL") hostname specified in the request using a Domain Name System ("DNS") mapping the URL hostname to the release router, the URL hostname associated with the service hosted by the server. The release router is configured to identify a relay agent registered with the release router for debugging the service, the relay agent executed by a test platform in a second network, and to forward the request to the test platform in the second network, wherein the test platform resolves the URL hostname specified in the request using a local DNS mapping the URL hostname to a localhost address.

In some embodiments of the system, the test platform is a computing device hosting a test instance of the service and configured for debugging the service. In some embodiments of the method, the release router is a proxy for the server and hosted on a computing device in the first network. In some embodiments of the system, the release router includes a processor coupled to memory and configured to execute instructions stored in the memory.

In some embodiments of the system, the release router is configured to check a set of routing rules for debug service requests and to identify the relay agent based on the set of routing rules. In some embodiments of the system, the release router is configured to update the set of routing rules based on a registration for one of: the test platform, the relay agent, or a test instance of the service hosted by the test platform.

In some embodiments of the system, the release router is configured to forward the request to the test platform in the second network via a service bus external to the second network, wherein the relay agent is registered with the service bus to receive the request. In some embodiments, the service bus is configured to forward, to the second network, requests directed to resource identifiers specifying a name for the service, wherein the URL of the received request specifies the name for the service. In some embodiments, the service bus is situated in the first network.

In some embodiments of the system, the release router is configured to receive, in the first network, a second request for the service hosted by the server in the first network, check a set of routing rules, and forward the second request to the server in the first network responsive to the set of rules.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method of routing service requests, the method comprising:
   receiving, by a release router in a first network, a request for a service hosted by a server in the first network, the request forwarded to the release router responsive to resolving a uniform resource locator ("URL") hostname specified in the request using a Domain Name System ("DNS") mapping the URL hostname to the release router, the URL hostname associated with the service hosted by the server;

identifying, by the release router, a relay agent registered with the release router for debugging the service, the relay agent executed by a test platform in a second network; and forwarding, by the release router, the request to the test platform in the second network, wherein the test platform resolves the URL hostname specified in the request using a local DNS mapping the URL hostname to a localhost address.

2. The method of claim 1, wherein the test platform is a computing device hosting a test instance of the service and configured for debugging the service.

3. The method of claim 1, comprising checking, by the release router, a set of routing rules for debug service requests and identifying the relay agent based on the set of routing rules.

4. The method of claim 3, comprising updating the set of routing rules based on a registration for one of: the test platform, the relay agent, or a test instance of the service hosted by the test platform.

5. The method of claim 1, further comprising forwarding the request to the test platform in the second network, by the release router, via a service bus external to the second network, wherein the relay agent is registered with the service bus to receive the request.

6. The method of claim 5, further comprising configuring the service bus to forward, to the second network, requests directed to resource identifiers specifying a name for the service, wherein the URL of the received request specifies the name for the service.

7. The method of claim 5, wherein the service bus is situated in the first network.

8. The method of claim 1, further comprising:
receiving, by the release router in the first network, a second request for the service hosted by the server in the first network;
checking, by the release router, a set of routing rules; and
forwarding the second request to the server in the first network responsive to the set of rules.

9. The method of claim 1, wherein the release router is a proxy for the server and hosted on a computing device in the first network.

10. A system for routing service requests, the system comprising:
a first network of computing devices including a server hosting a service; and
a release router in the first network configured to:
receive a request for the service hosted by the server in the first network, the request forwarded to the release router responsive to resolving a uniform resource locator ("URL") hostname specified in the request using a Domain Name System ("DNS") mapping the URL hostname to the release router, the URL hostname associated with the service hosted by the server;
identify a relay agent registered with the release router for debugging the service, the relay agent executed by a test platform in a second network; and
forward the request to the test platform in the second network, wherein the test platform resolves the URL hostname specified in the request using a local DNS mapping the URL hostname to a localhost address.

11. The system of claim 10, wherein the test platform is a computing device hosting a test instance of the service and configured for debugging the service.

12. The system of claim 10, the release router further configured to check a set of routing rules for debug service requests and to identify the relay agent based on the set of routing rules.

13. The method of claim 12, the release router further configured to update the set of routing rules based on a registration for one of: the test platform, the relay agent, or a test instance of the service hosted by the test platform.

14. The system of claim 10, the release router further configured to forward the request to the test platform in the second network via a service bus external to the second network, wherein the relay agent is registered with the service bus to receive the request.

15. The system of claim 14, wherein the service bus is configured to forward, to the second network, requests directed to resource identifiers specifying a name for the service, and wherein the URL of the received request specifies the name for the service.

16. The system of claim 14, wherein the service bus is situated in the first network.

17. The system of claim 10, the release router further configured to:
receive a second request for the service hosted by the server in the first network;
check a set of routing rules; and
forward the second request to the server in the first network responsive to the set of rules.

18. The system of claim 10, wherein the release router is a proxy for the server and hosted on a computing device in the first network.

19. A non-transitory computer-readable medium storing instructions that cause a processor executing the instructions for a release router in a first network to:
receive a request for a service hosted by a server in the first network, the request forwarded to the release router responsive to resolving a uniform resource locator ("URL") hostname specified in the request using a Domain Name System ("DNS") mapping the URL hostname to the release router, the URL hostname associated with the service hosted by the server;
identify a relay agent registered with the release router for debugging the service, the relay agent executed by a test platform in a second network; and
forward the request to the test platform in the second network, wherein the test platform resolves the URL hostname specified in the request using a local DNS mapping the URL hostname to a localhost address.

20. The non-transitory computer-readable medium of claim 19, further storing instructions that cause the processor executing the instructions to:
check a set of routing rules for debug service requests, the set of routing rules maintained based on a registration for one of: the test platform, the relay agent, or a test instance of the service hosted by the test platform; and
identify the relay agent based on the set of routing rules.

* * * * *